(12) United States Patent
Ohmori et al.

(10) Patent No.: US 10,754,179 B2
(45) Date of Patent: Aug. 25, 2020

(54) OPTICAL MODULATOR, OPTICAL MODULATOR MODULE, AND OPTICAL TRANSMITTER MODULE

(71) Applicant: Fujitsu Optical Components Limited, Kawasaki-shi, Kanagawa (JP)

(72) Inventors: Yasuhiro Ohmori, Sapporo (JP); Yoshinobu Kubota, Yokohama (JP); Masaharu Doi, Sapporo (JP); Shintaro Takeuchi, Sapporo (JP); Yoshihiko Yoshida, Sapporo (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 16/515,573

(22) Filed: Jul. 18, 2019

(65) Prior Publication Data
US 2020/0041824 A1 Feb. 6, 2020

(30) Foreign Application Priority Data
Jul. 31, 2018 (JP) .................................. 2018-144242

(51) Int. Cl.
*G02F 1/035* (2006.01)
*G02F 1/225* (2006.01)
*G02F 1/21* (2006.01)
*G02B 6/12* (2006.01)

(52) U.S. Cl.
CPC .............. *G02F 1/035* (2013.01); *G02F 1/225* (2013.01); *G02B 2006/12097* (2013.01); *G02F 2001/212* (2013.01); *G02F 2201/063* (2013.01); *G02F 2201/12* (2013.01); *G02F 2202/20* (2013.01)

(58) Field of Classification Search
None
See application file for complete search history.

(56) References Cited

U.S. PATENT DOCUMENTS

| | | | | |
|---|---|---|---|---|
| 5,276,745 A | * | 1/1994 | Revelli, Jr. | ............ G02B 6/1245 |
| | | | | 369/44.12 |
| 6,069,729 A | * | 5/2000 | Gill | ........................ G02F 1/035 |
| | | | | 359/245 |
| 2002/0146190 A1 | | 10/2002 | Doi et al. | |
| 2006/0029319 A1 | * | 2/2006 | Sugiyama | ............. G02F 1/2255 |
| | | | | 385/1 |
| 2010/0046881 A1 | | 2/2010 | Oikawa et al. | |

FOREIGN PATENT DOCUMENTS

JP 2008-250258 10/2008
JP 2012-78375 4/2012

OTHER PUBLICATIONS

Patent Abstracts of Japan English abstract for Japanese Patent Publication No. 2008-250258, published Oct. 16, 2008.
Patent Abstracts of Japan English abstract for Japanese Patent Publication No. 2012-78375, published Apr. 19, 2012.

* cited by examiner

*Primary Examiner* — Michael Stahl
(74) *Attorney, Agent, or Firm* — Staas & Halsey LLP

(57) ABSTRACT

An optical modulator includes an optical waveguide of a ridge type formed of a thin film of a dielectric material having an electro-optic effect over a substrate, a buffer layer covering the optical waveguide, and a signal electrode provided over the optical waveguide via the buffer layer, wherein a width of the signal electrode is greater than a ridge width of the optical waveguide and wherein the signal electrode covers at least one of sidewalls of a ridge of the optical waveguide.

15 Claims, 17 Drawing Sheets

AMOUNT OF PROTRUSION OF TERRACE: a

RIDGE SPACING $R_{gap}$

OPTICAL MODULATOR, OPTICAL MODULATOR MODULE, AND OPTICAL TRANSMITTER MODULE

CROSS-REFERENCE TO RELATED APPLICATIONS

This application is based upon and claims priority to earlier filed Japanese Patent Application No. 2018-144242 filed Jul. 31, 2018, which is incorporated herein by reference in its entirety.

FIELD

The present invention relates to an optical modulator, an optical modulator module, and an optical transmitter module.

BACKGROUND

To accommodate rapidly increasing traffic in recent years, there is an increasing demand in the optical communication field for expansion of transmission capacity toward 100 Gbps or 400 Gbps per channel, as well as for reduction in power consumption. Under such circumstances, compact design operable in a radio frequency band is desired for optical components such as optical modulators used in optical communications frontend circuits.

There are several types of electro-optic modulators operable at a radio frequency (RF), including lithium niobate ($LiNbO_3$) modulators, indium phosphate (InP) modulators, and silicon (Si) waveguide modulators. Among them, $LiNbO_3$ modulator (referred to as a "LN modulator") is currently mainstream in the optical modulator markets, from the viewpoint of the quantity of insertion loss, transmission characteristics, and controllability. In a typical LN modulator, titanium (Ti) is diffused in a LN substrate to fabricate optical waveguides. However, the modulation efficiency of LN modulators is insufficient due to poor light confinement. Besides, the chip length becomes 5 cm or more in order to guarantee the half-wavelength voltage $V\pi$ of the modulator.

A configuration with ridge waveguides formed on an LN substrate is proposed to enhance light confinement. See, for example, Patent Documents 1 to 3 listed below. FIG. 1 is a cross-sectional view of an optical modulator with ridge-type optical waveguides 131a and 131b. When a Z-cut LN substrate 120 is used, a signal electrode S is provided over the ridge waveguide via a buffer layer 14.

To enhance light confinement by means of a ridge waveguide on a Z-cut LN substrate, the height and the width of the waveguide become about 1 μm. The width of the signal electrode S provided on the ridge waveguide also becomes as narrow as about 1 μm. In general, the larger the cross sectional area of the electrode, the less the electrical attenuation, and RF characteristics can be improved. In order to increase the cross-sectional area of the signal electrode S under the configuration of FIG. 1, the height "h" of the signal electrode S will be 10 μm or more. It is difficult to form a signal electrode with such a high aspect ratio. Even though a high-aspect electrode could be fabricated, the electrode has a tendency to fall down and it is difficult to efficiently apply a voltage to the ridge waveguide. A compact design for an optical modulator with satisfactory modulation efficiency and RF characteristics is desired.

DOCUMENTS LISTS

Patent Document 1: Japanese Patent Application Laid-open Publication No. 2008-250258

Patent Document 2: Japanese Patent Application Laid-open Publication No. 2012-78375

Patent Document 3: U.S. Patent Application Publication No. 2002/0146190

SUMMARY

In one aspect of the invention, an optical modulator has an optical waveguide of a ridge type formed of a thin film of a dielectric material having an electro-optic effect over a substrate, a buffer layer covering the optical waveguide, and a signal electrode provided over the optical waveguide via the buffer layer, wherein a width of the signal electrode is greater than a ridge width of the optical waveguide and wherein the signal electrode covers at least one of sidewalls of a ridge of the optical waveguide.

The object and advantages of the invention will be realized and attained by means of the elements and combinations particularly pointed out in the claims. It is to be understood that both the foregoing general description and the following detailed description are exemplary and explanatory and are not restrictive to the invention as claimed.

DESCRIPTION OF EMBODIMENTS

Figure 1:
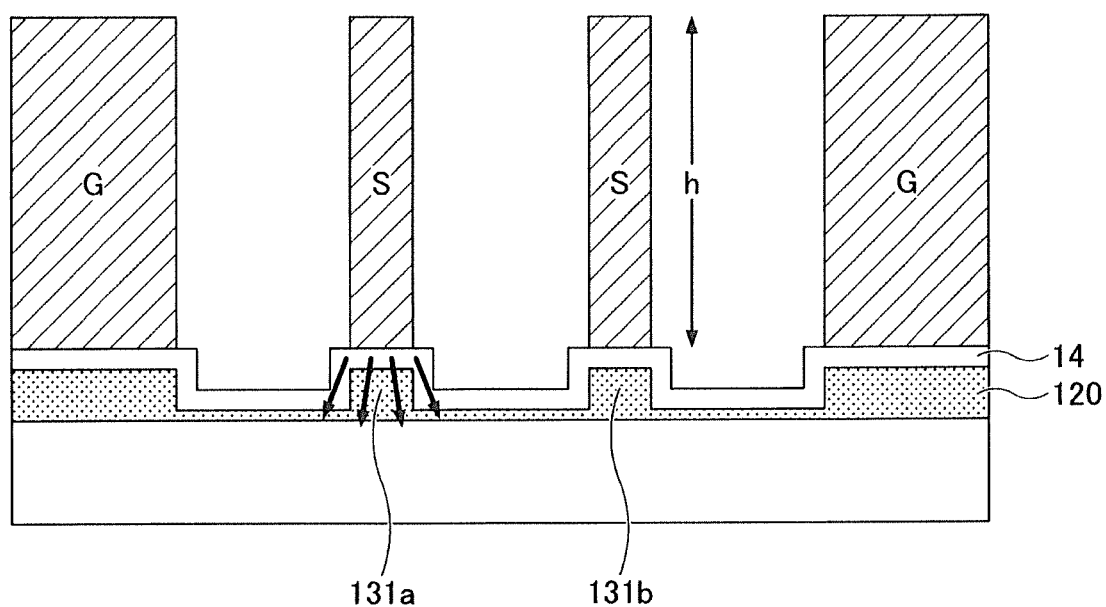
FIG. 1 is a schematic diagram of a conventional ridge waveguide using a Z-cut LN substrate.
Figure 2:
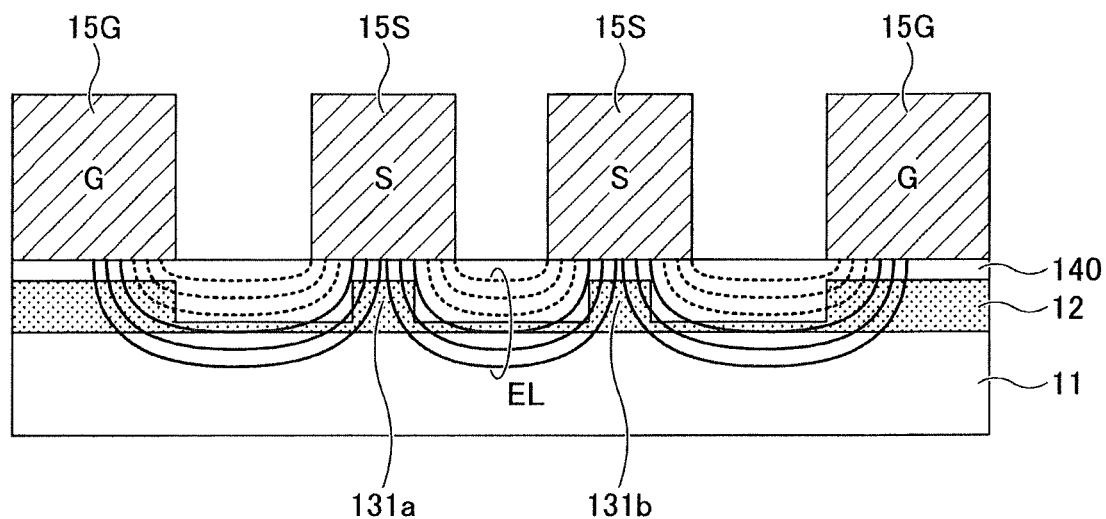
FIG. 2 is a schematic diagram illustrating an optical modulator conceived during development of configurations of the present invention.

FIG. 2 schematically illustrates an optical modulator conceived during development of configurations of the present invention. Ridge-type Optical waveguides 131a and 131b are formed of a LiNbO$_3$ thin film 12 over a substrate 11. In the context of the embodiments, "ridge" refers to a state or a shape of an elongated region such as optical waveguide 131a or 131b that protrudes from another plane.

The crystal orientation of the LiNbO$_3$ thin film 12 is <001>, as in a Z-cut LN substrate. In order to solve the problem of the aspect ratio of the signal electrode S, a buffer layer 140 is formed to be thick and then flattened by polishing or the like. On the flat buffer layer 140 is formed a signal electrode 15S having a width greater than that of the optical waveguides 131a and 131b. When the width of the ridge-type optical waveguides 131a and 131b is 1 μm, for example, a signal electrode 15S with a width of 3 μm is provided. With this configuration, the height of the signal electrode 15S can be reduced because a sufficient cross-sectional area is secured, and the configuration becomes stable.

However, an extra step for planarization of the buffer layer 140 is required, and besides, the electric field spreads in the lateral direction through the buffer layer 140 and it cannot be applied efficiently to the ridge. As schematically illustrated by lines EL of electric force in the figure, the number of lines EL of electric force that extend from the signal electrode 15S to the optical waveguides 131a and 131, in a direction substantially perpendicular thereto, decreases. Consequently, the density of the electric field applied to the ridge is reduced. Among the illustrated lines EL of electric force, the solid lines indicate the electric field component that efficiently contributes to optical modulation, and the dotted lines indicate the electric field component that becomes loss. In order to achieve the desired modulation efficiency in the configuration of FIG. 2, the half-wave voltage Vπ may become higher, and the power consumption may increase.

To avoid such inconvenience, in Mach-Zehnder (MZ) optical modulators of the embodiments, a signal electrode is provided to each of a pair of ridge waveguides that forms a MZ interferometer so as to cover a top surface and at least an outer sidewall of the ridge. In other words, the signal electrode configured to apply electric voltage in the Z direction perpendicular to the substrate onto the corresponding ridge waveguide is designed so as to cover only the outer sidewall or both the inner and the outer sidewalls of the ridge with respect to the center axis of the MZ interferometer. By employing this configuration, satisfactory modulation efficiency and RF characteristics are achieved in an optical modulator. Particular examples of optical modulators will be described below.

First Embodiment

Figure 3:
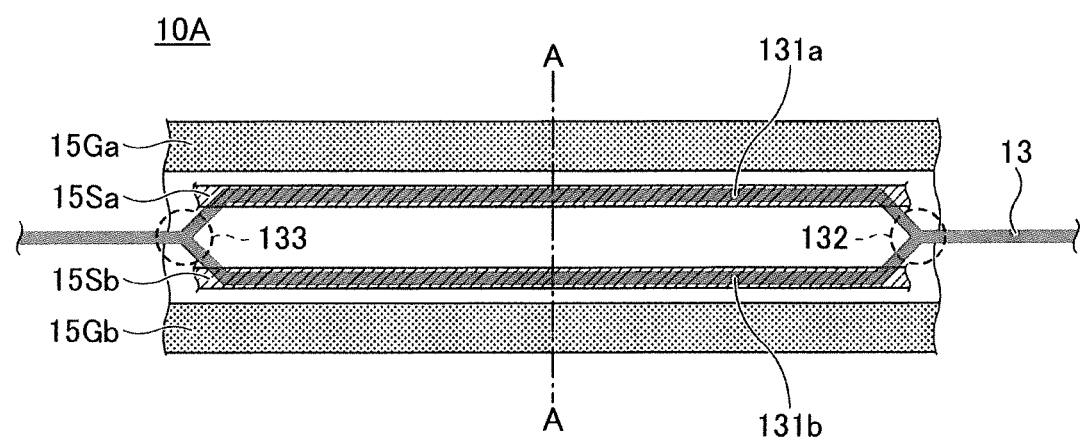
FIG. 3 is a plan view of an optical modulator according to the first embodiment.
Figure 4:
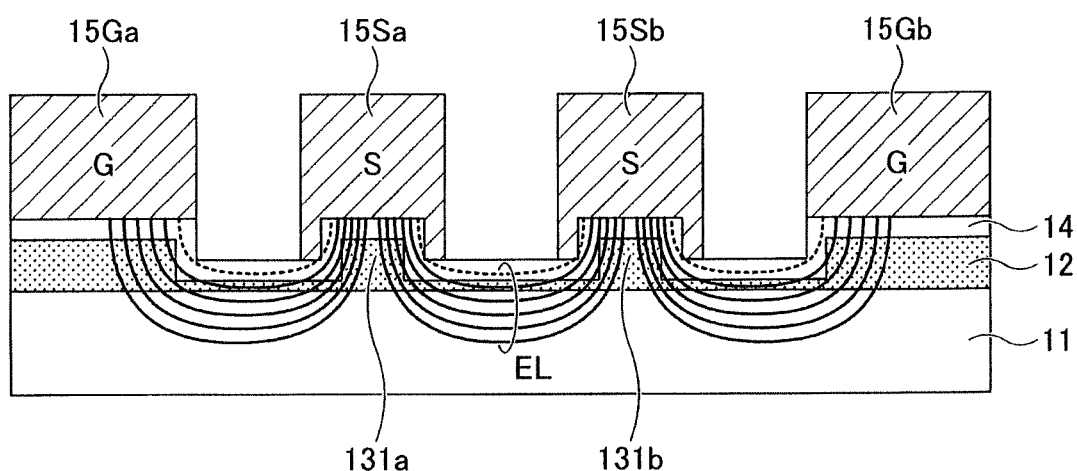
FIG. 4 is a cross-sectional view taken along the A-A' line of FIG. 3.

FIG. 3 is a schematic plan view of an optical modulator 10A according to the first embodiment. FIG. 4 is a cross-sectional view taken along the A-A' line of FIG. 3. The optical modulator 10A is, for example, a MZ modulator with a pair of ridge-type optical waveguides 131a and 131b. As has been described above, the term "ridge" refers to a state or a shape of an elongated region protruding in a direction perpendicular to the substrate or in the direction of layer stacking over the substrate. The pair of ridge-type optical waveguides 131a and 131b extend between Y-branches 132 and 133 of an optical waveguide 13. The optical waveguide 13 and the optical waveguides 131a and 131b are formed of a thin film of LiNbO$_3$, which is an example of a material that exhibits a large quantity of change in refractive index and has an electro-optic effect.

Signal electrodes 15Sa and 15Sb are provided to the optical waveguides 131a and 131b, respectively. Ground electrodes 15Ga and 15Gb are provided on outer sides of the signal electrodes 15Sa and 15Sb, respectively.

When drive voltages are applied through the signal electrodes 15Sa and 15Sb (which may be referred to collectively as "signal electrode 15S" as appropriate) to the optical waveguides 131a and 131b (which may be referred to collectively as "optical waveguides 131"), the light beams travelling through the optical waveguides 131a and 131b are modulated due to change in the refractive index. For example, a pair of drive signals of opposite signs may be applied to the signal electrodes 15Sa and 15Sb to change the optical phases of light beams travelling through the optical waveguides 131a and 131b in the opposite directions. The optical waveguides 131a and 131b provided with the signal electrodes 15Sa and 15Sb form an electro-optic interaction part of the optical modulator 10A in the sense of causing an interaction between light and electric signals.

FIG. 4 is a cross-sectional view taken along the A-A' line of the interaction part of FIG. 3. A thin film 12 with an electro-optic effect is formed over the substrate 11. The ridge-type optical waveguides 131a and 131b are formed on a part of the thin film 12. The thin film 12 is formed of, for example, LiNbO$_3$ whose Z axis is oriented in a direction perpendicular to the substrate 11. The substrate 11 is formed of a material different from the thin film 12, such as glass, MgO, sapphire, etc., the material having a refractive index lower than the thin film 12 at the wavelength in use and less optical absorption.

The width and height of the ridge-type optical waveguides 131a and 131b are approximately 1 μm. Light confinement in the lateral direction is defined by the sidewalls of the ridge of the optical waveguides 131a and 131b. Light confinement in the direction vertical to the substrate is defined by the top surface of the optical waveguides 131a and 131b and the substrate 11.

A buffer layer 14 is formed so as to cover the entire surface of the chip including the optical waveguides 131a and 131b. The buffer layer 14 is formed of a material with a refractive index lower than the thin film 12 at the wavelength in use and with less optical absorption. Such a material includes, but is not limited to silicon oxide. Although the thickness of the buffer layer 14 is less than the thickness of the thin film 12, the buffer layer 14 is thick enough to prevent absorption of light due to the metal of the electrode.

A signal electrode 15Sa with a width greater than that of the optical waveguide 131a is provided to the optical waveguide 131a. A signal electrode 15Sb with a width greater than that of the optical waveguide 131b is provided to the optical waveguide 131b. The signal electrode 15Sa covers the sidewalls of the ridge of the optical waveguide 131a via the buffer layer 14. The signal electrode 15Sb covers the sidewalls of the ridge of the optical waveguide 131b via the buffer layer 14.

Ground electrodes 15Ga and 15Gb (which may be referred to collectively as "ground electrodes 15G" as appropriate) are provided on the outer side of the signal electrodes 15Sa and 15Sb, respectively, to form a so-called "GSSG" differential electrode structure.

An electric field produced between the signal electrode 15Sa and the ground electrode 15Ga and an electric field generated between the adjacent signal electrodes 15Sa and 15Sb are applied to the optical waveguide 131a. An electric field produced between the signal electrode 15Sb and the ground electrode 15Gb and an electric field generated between adjacent signal electrodes 15Sb and 15Sa are applied to the optical waveguide 131b.

The space between the signal electrode 15Sa and the ground electrode 15Ga and the space between the signal electrode 15Sb and the ground electrode 15Gb are preferably as narrow as possible from the viewpoint of modulation efficiency, as long as the capacitance between electrodes does not exceed the acceptable range. With this configuration, the optical modulator 10A and the external devices are impedance-matched and operations at the RF band are guaranteed.

In the example of FIG. 4, the position of the center axis in the width direction of the optical waveguide 131a substantially coincides with the position of the center axis in the width direction of the signal electrode 15Sa. The signal electrode 15Sa covers, via the buffer layer 14, the top surface and sidewalls of the ridge of the optical waveguide 131a. Similarly, the position of the center axis in the width direction of the optical waveguide 131b substantially coincides with the position of the center axis in the width direction of the signal electrode 15Sb. The signal electrode 15Sb covers, via the buffer layer 14, the top surface and sidewalls of the ridge of the optical waveguide 131b.

By covering the sidewalls of the ridge with the signal electrode 15S via the buffer layer 140, an electric field is applied in a direction substantially perpendicular to the top surface of the ridge, as schematically illustrated by the lines EL of electric force. Wasteful spreading of electric field into the buffer layer 14 can be reduced. Inverted and non-inverted signals are applied to the signal electrodes 15Sa and 15Sb. A part of the lines EL of electric force of a forward voltage applied from, for example, the signal electrode 15Sa to the optical waveguide 131a are connected to the optical waveguide 131b in the reverse direction, and contributes to the differential drive of the optical modulator 10A. Similarly, a part of the lines EL of electric force of a reverse voltage applied from, for example, the signal electrode 15Sb to the optical waveguide 131b are connected to the optical waveguide 131a in the forward direction, and contributes to the differential drive of the optical modulator 10A.

Figure 5:
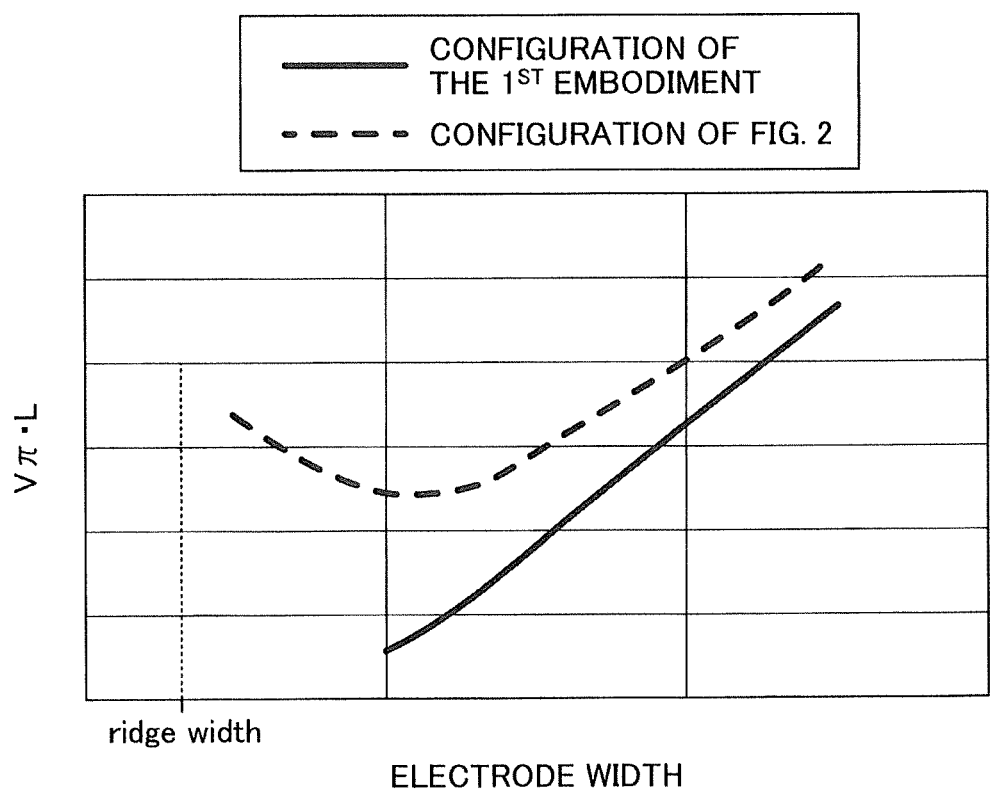
FIG. 5 illustrates an advantageous effect of the configuration of the first embodiment.

FIG. 5 illustrates an advantageous effect of the configuration of the first embodiment. The horizontal axis represents width of the signal electrode 15S, and the vertical axis represents Vπ*L, which is an index representing the modulation efficiency, wherein Vπ is a half wavelength voltage required to change the optical phase of light by n radians, and L is an interaction length. As a reference example, the characteristic of the optical modulator of FIG. 2 with a planarized surface of buffer layer 140, having been discussed during the process leading to the present invention, is also illustrated by the dashed line. In the simulation of these two configurations, the height of the electrode is set to the same value.

In the configuration of FIG. 2, as the width of the signal electrode S provided on the flat buffer layer 140 is increased over the ridge width (indicated by the dotted line), the value of Vπ*L becomes smaller and the modulation efficiency is improved. However, from a certain point of electrode width, the Vπ*L value increases. This is because the electric field spreads inside the buffer layer 140 and undesirable loss occurs. The point at which the Vπ*L is minimized in the dashed line is the optimum electrode width in the configuration of FIG. 2.

In the simulation result of the first embodiment indicated by the solid line, Vπ*L becomes the minimum at the optimum point of the electrode width for the reference example; however, the Vπ*L value is much lower and the modulation efficiency is much improved, compared with the configuration of FIG. 2. The light beams travelling through the optical waveguides 131a and 131b can be modulated under a lower level Vπ. The interaction length L can also be reduced owing to the reduced Vπ voltage, and the optical modulator can be downsized.

Even with the configuration of the first embodiment, the characteristic of the optical modulator gradually approaches that of the dashed line, as the width of the signal electrode 15S increases. This is because in the configuration of FIG. 4, when the width of the signal electrode 15S becomes too large over the width of the ridge-type optical waveguides 131a and 131b, the applied electric field cannot be used efficiently and a certain amount of loss occurs.

The electrode width that minimizes the Vπ*L value in the dashed line of the planarized buffer structure of FIG. 2 can be selected as the optimum width for the signal electrode 15S of the embodiment. Based upon the width of the signal electrode 15S and the widths of the optical waveguides 131a and 131b, the thickness of the buffer layer 14 of the first embodiment can be set to an appropriate value. According to this design scheme, RF drive signals can be applied to the signal electrodes 15Sa and 15Sb to perform high-speed modulation.

Figure 6A:
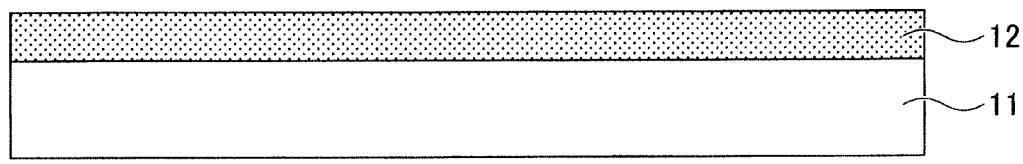
FIG. 6A illustrates a fabrication process of the optical modulator of the first embodiment.

FIG. 6A through FIG. 6D illustrate a fabrication process of the optical modulator 10A of the first embodiment. In FIG. 6A, a dielectric thin film 12 is formed on a substrate 11 which is made of glass, sapphire, MgO or the like. The dielectric thin film 12 is formed of a material having a refractive index higher than the substrate 11 and having an electro-optic effect. For example, a $LiNbO_3$ thin film 12 with a thickness of 1 μm to 2 μm is formed by magnetron sputtering on a glass substrate 11 of a thickness of 500 μm.

Figure 6B:
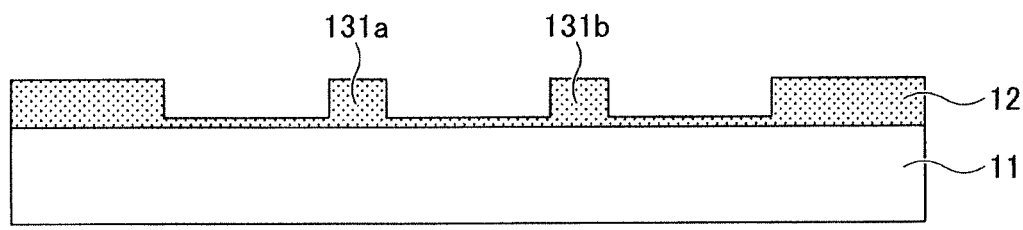
FIG. 6B illustrates a fabrication process of the optical modulator of the first embodiment.

In FIG. 6B, a mask with a desired pattern is formed over the thin film 12 by photolithography or the like, and a ridge waveguide pattern is formed in the thin film 12 by etching. For anisotropic dry etching such as reactive ion etching (RIE) or reactive ion beam etching, a metal mask, a fluorine resin mask combined with a noble metal film, or other suitable etching mask may be used. When performing wet etching to form the ridge waveguide, a predetermined mask pattern is formed of a noble metal and the wafer is immersed in an etchant, whereby a waveguide pattern including the pair of optical waveguides 131a and 131b is obtained. In this step of etching, the thin film 12 may be slightly left over the surface of the substrate 11 in the interaction part.

Figure 6C:
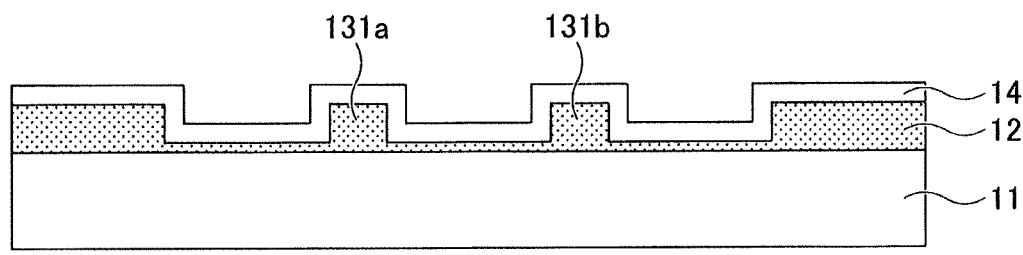
FIG. 6C illustrates a fabrication process of the optical modulator of the first embodiment.

In FIG. 6C, a buffer layer 14 is formed over the entire surface by sputtering, evaporation, CVD, or any other appropriate process. For the buffer layer 14, a silicon oxide film with a thickness of 500 nm to 1000 nm may be formed.

Figure 6D:
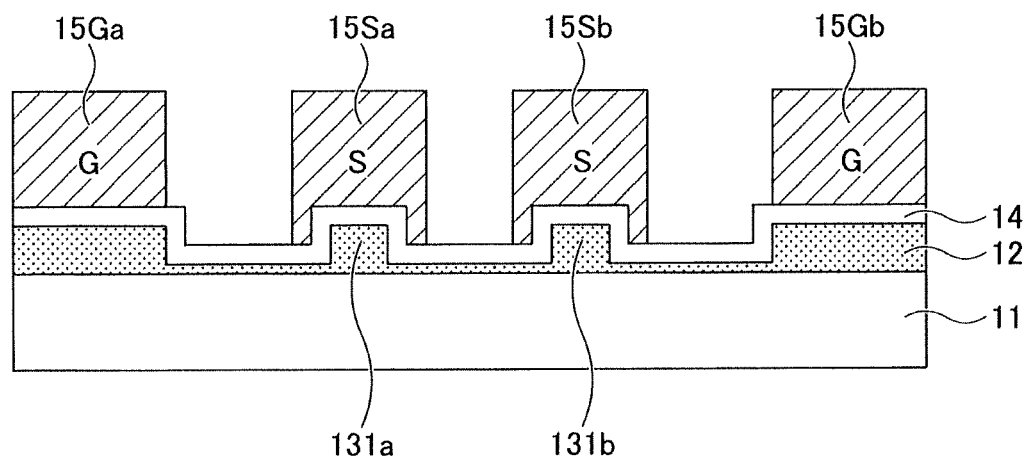
FIG. 6D illustrates a fabrication process of the optical modulator of the first embodiment.

In FIG. 6D, a plating resist mask having a predetermined opening pattern is formed over the wafer, and signal electrodes 15Sa and 15Sb and ground electrodes 15Ga and 15Gb are formed by plating. In this step, the opening pattern of the plating resist mask is formed such that the widths of the signal electrodes 15Sa and 15Sb are greater than the widths of the optical waveguides 131a and 131b, and that the sidewalls of the ridges of the optical waveguides 131a and 131b are covered via the buffer layer 14 by the signal electrodes 15Sa and 15Sb. The signal electrodes 15Sa and 15Sb and the ground electrodes 15Ga and 15Gb are formed of, for example, a Ti/Au stack in which a titanium (Ti) layer is formed over a gold (Au) layer. The signal electrodes 15Sa and 15Sb have, for example, a width of 3 μm to 4 μm, and a height of 4 μm to 10 μm.

After the plating process, the plating resist mask is removed and the optical modulator 10A with a configuration of FIG. 3 is acquired. The wafer is then cut into chips by dicing.

By this fabrication process, a stable configuration of signal electrodes 15Sa and 15Sb is achieved and electric voltage can be applied effectively from the direction perpendicular to the substrate 11 onto the $LiNbO_3$ ridge waveguide. Because of the reduced Vπ voltage and interaction length L, the modulation efficiency and the RF characteristics of the optical modulator are improved.

Second Embodiment

Figure 7:
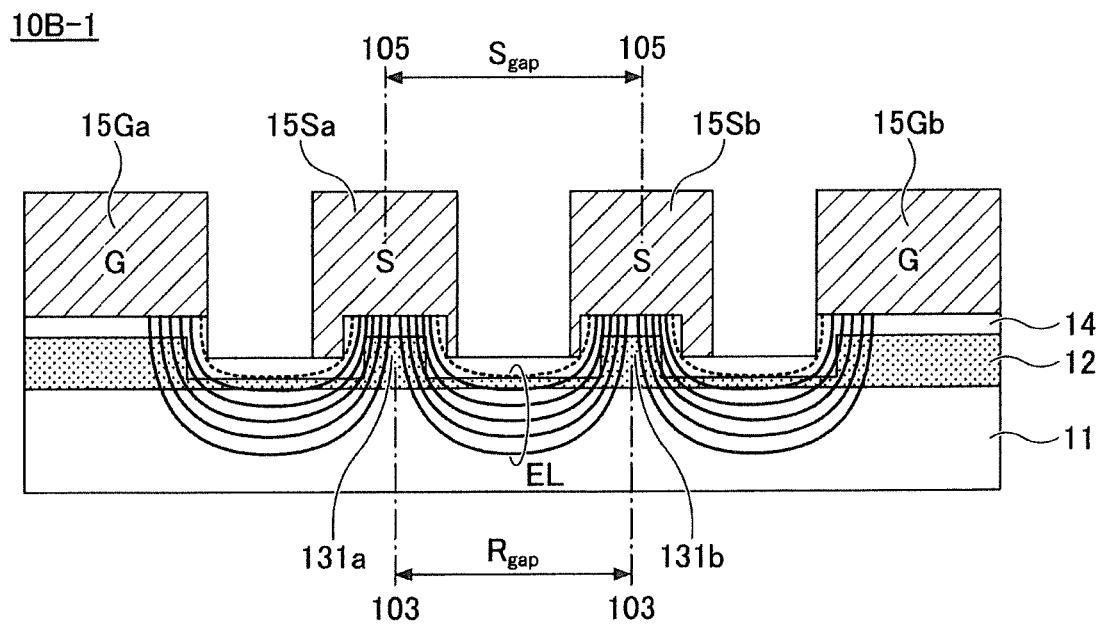
FIG. 7 is a schematic diagram of an optical modulator according to the second embodiment.

FIG. 7 is a schematic cross-sectional view of an interaction part of an optical modulator 10B-1 according to the second embodiment. In the first embodiment, the signal electrodes 15Sa and 15Sb with a width greater than that of the optical waveguides 131a and 131b are provided so as to be arranged symmetrically with respect to the center axes of the corresponding optical waveguides 131a and 131b.

In the second embodiment, the space or the distance between the optical waveguides 131a and 131b of the MZ interferometer is reduced, and an asymmetric configuration, in which the thickness of the outer part of the signal electrode 15S covering the outer sidewall of the ridge is greater than the thickness of the inner part of the signal electrode 15S covering the inner sidewall of the ridge, is employed.

The optical modulator 10B-1 has ridge-type optical waveguides 131a and 131b formed of a thin film 12 with an electro-optic effect on the substrate 11. The entire surface of the wafer, including the optical waveguides 131a and 131b, is covered with the buffer layer 14. The substrate 11, the thin film 12, and the buffer layer 14 may be formed with the same materials and the same dimensions as those in the first embodiment.

The signal electrodes 15Sa and 15Sb are provided over the optical waveguides 131a and 131b via the buffer layer 14. Ground electrodes 15Ga and 15Gb are provided on the outer side of the signal electrodes 15Sa and 15Sb, respectively.

The space $S_{gap}$ between the center axes 105 of the signal electrodes 15Sa and 15Sb is wider than the space $R_{gap}$ between the center axes 103 of the ridges of the optical waveguides 131a and 131b. The center axis 105 in the width direction of the signal electrode 15Sa is offset toward the outer side of the MZ interferometer from the center axis 103 in the width direction of the optical waveguide 131a. The center axis 105 in the width direction of the signal electrode 15Sb is offset toward the outer side of the MZ interferometer from the center axis 103 of the optical waveguide 131b.

In the differentially driven optical modulator 10B-1, the narrower the space between the optical waveguides 131a and 131b in the interaction part, the better the modulation efficiency can be acquired, with lower Vπ. On the other hand, from the viewpoint of the RF characteristics, it is preferable to increase the width of the signal electrodes 15Sa and 15Sb over the ridge width of the optical waveguides 131a and 131b, while maintaining a certain amount of space between the signal electrodes 15Sa and 15Sb, as in the first embodiment. In order to satisfy these conditions, the space $S_{gap}$ between the center axes of the signal electrodes 15Sa and 15Sb is wider than the space $R_{gap}$ between the center axes of the ridges of the optical waveguides 131a and 131b, and an asymmetric or offset configuration is adopted.

The configuration of FIG. 7 can further improve the modulation efficiency with lower Vπ and maintaining the same RF characteristics, compared with the configuration of the first embodiment, by narrowing the space between the optical waveguides 131a and 131b.

In one example, the cross-sectional area size of the optical waveguides 131a and 131b is 1×1 μm², the width of the signal electrodes 15Sa and 15Sb is 3 μm to 4 μm, the space $R_{gap}$ between the center axes of the ridges is 8 μm to 9 μm, and the space $S_{gap}$ between center axes of the signal electrodes 15Sa and 15Sb is 10 μm to 12 μm.

By narrowing the space between the optical waveguides 131a and 131b, the electric field can be applied more efficiently in the direction substantially perpendicular to the optical waveguides 131a and 131b, as schematically illustrated by the lines EL of electric force.

Figure 8:
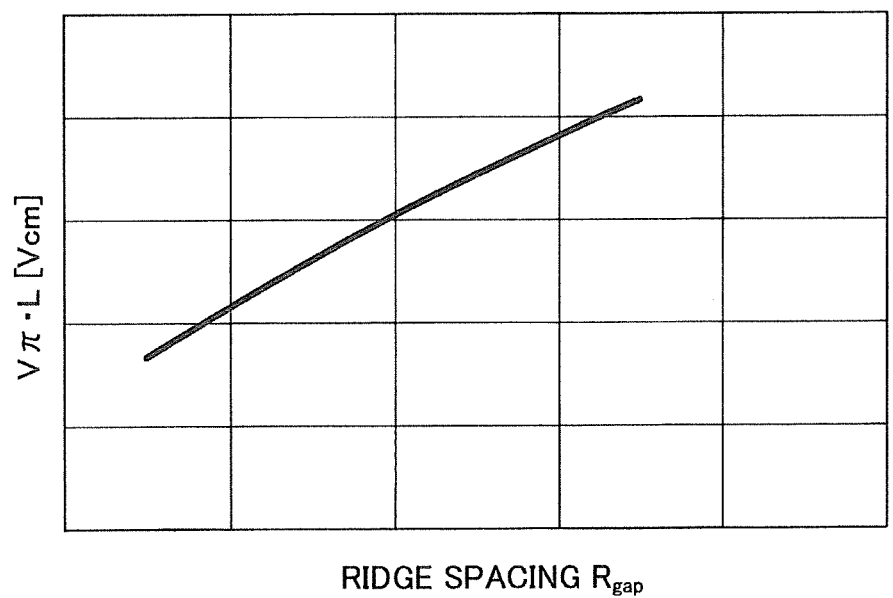
FIG. 8 illustrates a relation between a ridge spacing and $V\pi L$.

FIG. 8 illustrates modulation efficiency (Vπ*L) as a function of space $R_{gap}$ between the center axes of the ridges of the optical waveguides 131a and 131b. As the space $R_{gap}$ between the centers of the ridges decreases, the value Vπ*L (Vcm) becomes smaller, and the modulation efficiency increases. However, when the optical waveguides 131a and 131b are arranged too close without changing the positions of the signal electrodes 15Sa and 15Sb, the buffer layers 14 covering the inner sidewalls of the ridges of the optical waveguides 131a and 131b will protrude inward from the sidewalls of the corresponding signal electrodes 15Sa and 15Sb. When the optical waveguides 131a and 131b come closer to each other exceeding a certain limit (for example, protruding inward by one fifth (⅕) or more of the ridge width from the electrode sidewall), the electric field cannot be applied effectively onto the ridge. In this case, a short circuit will occur and Vπ*L rises rapidly, failing to work as the optical modulator.

To avoid this, the space $S_{gap}$ between the signal electrodes 15Sa and 15Sb is designed so as not to impair the RF characteristics, while securing efficient application of the electric field onto the optical waveguides 131a and 131b. The optical modulator 10B-1 is designed such that the space $R_{gap}$ between the center axes of the optical waveguides 131a and 131b is minimized for the signal electrodes 15Sa and 15Sb designed in the optimum arrangement.

Figure 9:
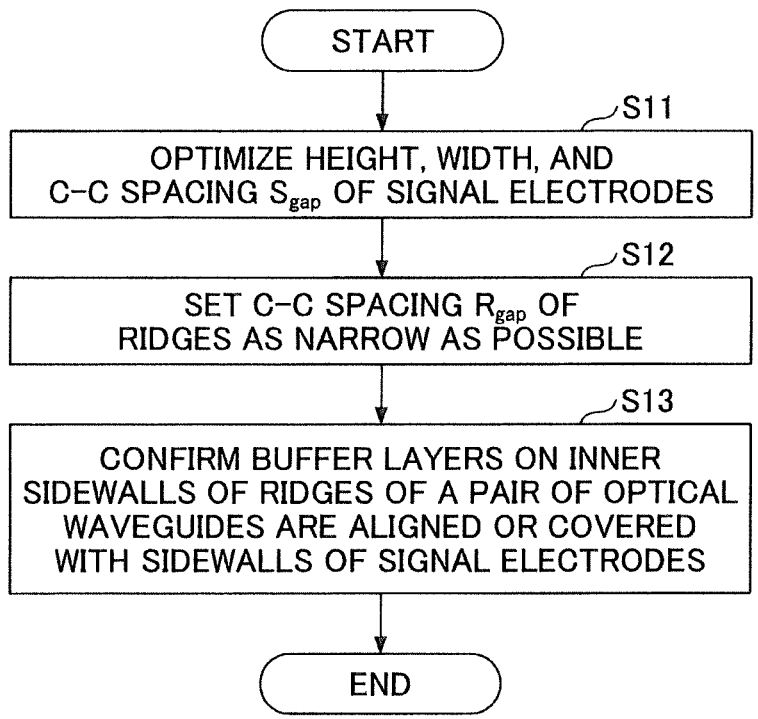
FIG. 9 is a flowchart of designing an optical modulator of the second embodiment.

FIG. 9 is a flow chart of designing the optical modulator 10B-1 of the second embodiment. First, the space $S_{gap}$ between the center axes 105, the height, and the width of the signal electrodes 15Sa and 15Sb are optimized (S11). The optimum space $S_{gap}$ between the signal electrodes 15Sa and 15Sb is the minimum space that can maintain the satisfactory RF characteristics, suppressing electrostatic capacitance at or below a predetermined level and without causing crosstalk. The optimum width of the signal electrodes 15Sa and 15Sb is one capable of efficiently applying an electric field to the optical waveguides 131a and 131b from the direction substantially perpendicular thereto at the minimum loss. The optimum height of the signal electrodes 15Sa and 15Sb is one that achieves a sufficiently large cross-sectional area, while not preventing downsizing, for the signal electrodes 15Sa and 15Sb.

When the optimal design and layout of the signal electrodes 15Sa and 15Sb are determined, then the space $R_{gap}$ between the ridge centers of the optical waveguides 131a and 131b is set as small as possible (S12). Then, it is confirmed that in the optical waveguides 131a and 131b, the buffer layer 14 covering the inner sidewall of the ridge is covered with or aligned with the sidewall of the associated one of the signal electrodes 15Sa and 15Sb (S13). If the inner sidewalls of the ridges of the optical waveguides 131a and 131b come too close to each other shifting inward with respect to the MZ interferometer from the sidewalls of the signal electrodes 15Sa and 15Sb, a short circuit will occur and the optical modulator 10B-1 does not function.

Figure 10:
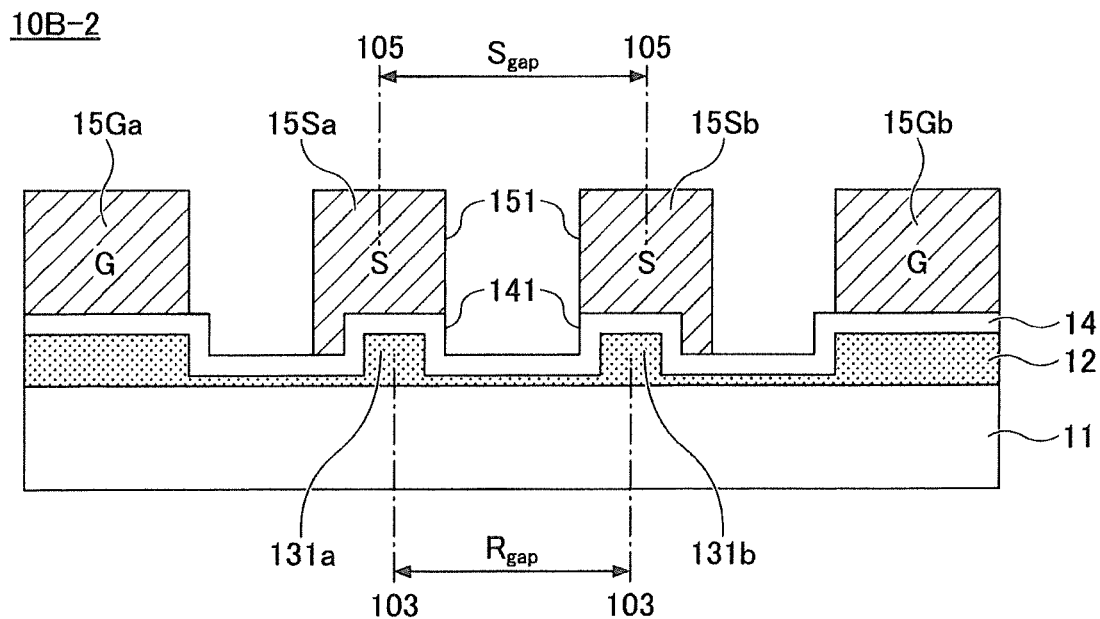
FIG. 10 is a schematic cross-sectional view of an optical modulator of a modification of the second embodiment.

FIG. 10 illustrates an optical modulator 10B-2 which is a modification of the second embodiment. In the modification of FIG. 10, in connection with step S13 of the flowchart of FIG. 9, the inner sidewalls of the ridges of the optical waveguides 131a and 131b are not covered with the signal electrodes 15Sa and 15Sb, and instead, the side surfaces 141 of the buffer layer 14 are aligned with the inner sidewalls 151 of the signal electrodes 15Sa and 15Sb.

In this configuration, the space $S_{gap}$ between the centers of the signal electrodes 15Sa and 15Sb is greater than the space $R_{gap}$ between the ridge centers of the optical waveguides 131a and 131b, and the center axes 105 of the signal electrodes 15Sa and 15Sb are offset outward from center axes 103 of the optical waveguides 131a and 131b, as in the optical modulator 10B-1 of FIG. 7.

The configuration of FIG. 10 is particularly useful for the "GSSG" electrode pattern. With the "GSSG" pattern, the main contributor in the signal electrodes 15S to the modulation efficiency is the part located over the top surface of the ridge to efficiently apply the electric field from the direction perpendicular to the ridge. Within the appropriate scope of layout design for signal electrodes, the space $R_{gap}$ between the ridge centers of the optical waveguides 131a and 131b can be minimized to maximize the modulation efficiency.

Third Embodiment

Figure 11:
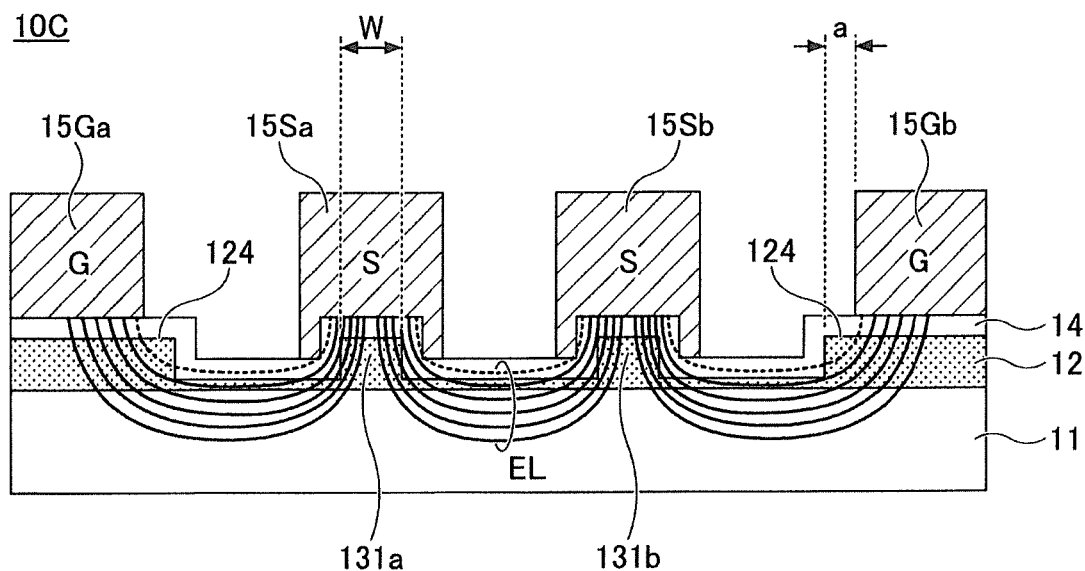
FIG. 11 is a schematic cross-sectional view of an optical modulator according to the third embodiment.

FIG. 11 is a schematic cross-sectional view of the interaction part of an optical modulator 10C according to the third embodiment. In the third embodiment, the thin film 12 of LiNbO$_3$ under the ground electrode 15Ga has a terrace 124 which extends toward the optical waveguide 131a from the inner sidewall of the ground electrode 15Ga in the GSSG pattern. Similarly, the thin film 12 of LiNbO$_3$ under the ground electrode 15Gb has a terrace 124 which extends toward the optical waveguide 131b from the inner sidewall of the ground electrode 15Gb in the GSSG pattern. The amount of protrusion of the terrace 124 of the thin film 12 from the inner sidewall of the ground electrode 15G toward the optical waveguide 131 is denoted as "a". The other configurations are the same as those of the first embodiment.

The optical modulator 10C has ridge-type optical waveguides 131a and 131b formed of a thin film 12 with an electro-optic effect, such as a LiNbO$_3$ film, over the substrate 11. The width W of the optical waveguides 131a and 131b is, for example, about 1 μm, and the width of the signal electrodes 15Sa and 15Sb is greater than the width W of the optical waveguides 131a and 131b. The ridges of the optical waveguides 131a and 131b are covered with the signal electrodes 15Sa and 15Sb, respectively, via the buffer layer 14 at both sidewalls.

As schematically illustrated by the lines EL of electric force, the electric field produced by the signal electrode 15Sa and the ground electrode 15Ga is efficiently applied to the ridge of the optical waveguide 131a, and the electric field produced by the signal electrode 15Sb and the ground electrode 15Gb is efficiently applied to the ridge of the optical waveguide 131b. In particular, the lines EL of electric force obliquely extending from each of the signal electrodes 15Sa and 15Sb are directed toward the ground electrodes 15Ga and 15Gb owing to the presence of the terraces 124. The electric field component obliquely entering the terrace 124 of the thin film 12 under the ground electrode 15G can also be used, efficiently making use of the applied electric field. Consequently, Vπ is reduced, and the modulation efficiency is improved.

Figure 12:
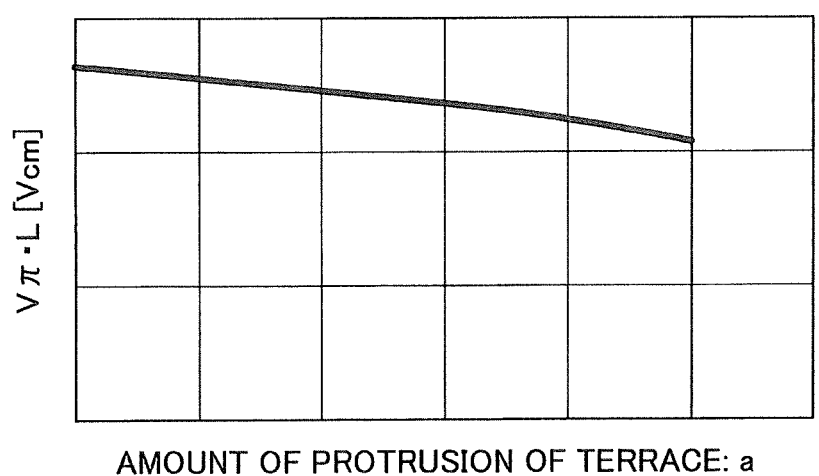
FIG. 12 illustrates an advantageous effect of a terrace structure of the third embodiment.

FIG. 12 illustrates the relationship between amount of protrusion of the terrace 124 and Vπ*L. As the amount "a" of protrusion of the terrace increases, Vπ*L decreases and the modulation efficiency increases. However, upon exceeding a predetermined amount of protrusion, short circuit occurs, Vπ*L rises abruptly and the optical modulator 10C does not function. By appropriately setting the amount "a" of protrusion of the terrace so as to minimize Vπ*L, the modulation efficiency of the optical modulator 10C can be improved.

Fourth Embodiment

Figure 13:
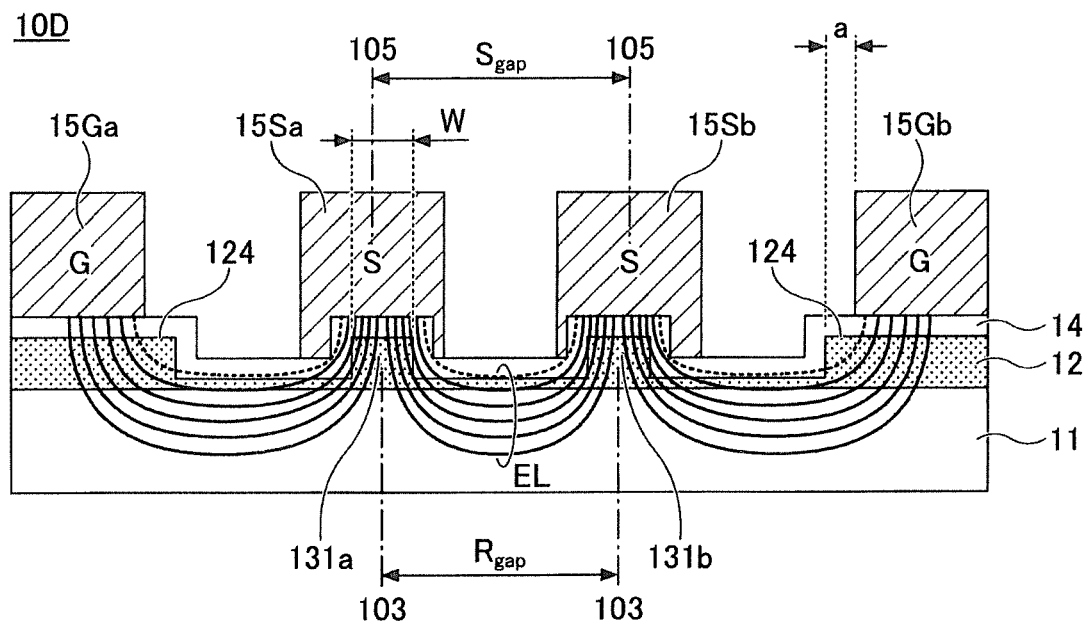
FIG. 13 is a schematic cross-sectional view of an optical modulator according to the fourth embodiment.

FIG. 13 is a schematic cross-sectional view of the interaction part of an optical modulator 10D according to the fourth embodiment. In the fourth embodiment, the offset (or asymmetric) configuration of the signal electrode 15S of the second embodiment is combined with the terrace structure of the thin film 12 of the third embodiment.

The optical modulator 10D has ridge-type optical waveguides 131a and 131b formed of a thin film 12 with an electro-optic effect, such as a LiNbO$_3$ film, over the substrate 11. The entire surface of the wafer, including the optical waveguides 131a and 131b, is covered with the buffer layer 14. The materials and the dimensions of the substrate 11, the thin film 12, and the buffer layer 14 may be the same as those in the first embodiment.

The space $S_{gap}$ between the centers of the signal electrodes 15Sa and 15Sb provided over the optical waveguides 131a and 131b via the buffer layer 14 is greater than the space $R_{gap}$ between the ridge centers of the optical waveguides 131a and 131b. The center axis 105 in the width direction of the signal electrode 15Sa is offset from the center axis 103 in the width direction of the optical waveguide 131a outward with respect to the MZ interferometer. The center axis 105 in the width direction of the signal electrode 15Sb is offset from the center axis 103 in the width direction of the optical waveguide 131b outward with respect to the MZ interferometer.

Terraces 124 are formed in the thin film 12 of LiNbO$_3$ located under the ground electrodes 15Ga and 15Gb so as to protrude from the inner sidewalls of the ground electrodes 15Ga and 15Gb toward the optical waveguides 131a and 131b. The amount "a" of protrusion of the terrace 124 is selected so as to minimize the value of V$\pi$*L.

By shifting the center axes 105 of the signal electrodes 15Sa and 15Sb outwardly from the center axes 103 of the optical waveguides 131a and 131b, the density of electric field applied in the direction substantially perpendicular to the ridge-type optical waveguides 131a and 131b increases and the modulation efficiency is improved. Besides, the density of electric field produced by the signal electrode 15Sa and the ground electrode 15Ga and the density of electric field produced by the signal electrode 15Sb and the ground electrode 15Gb can be increased and the modulation efficiency is further enhanced.

Figure 14:
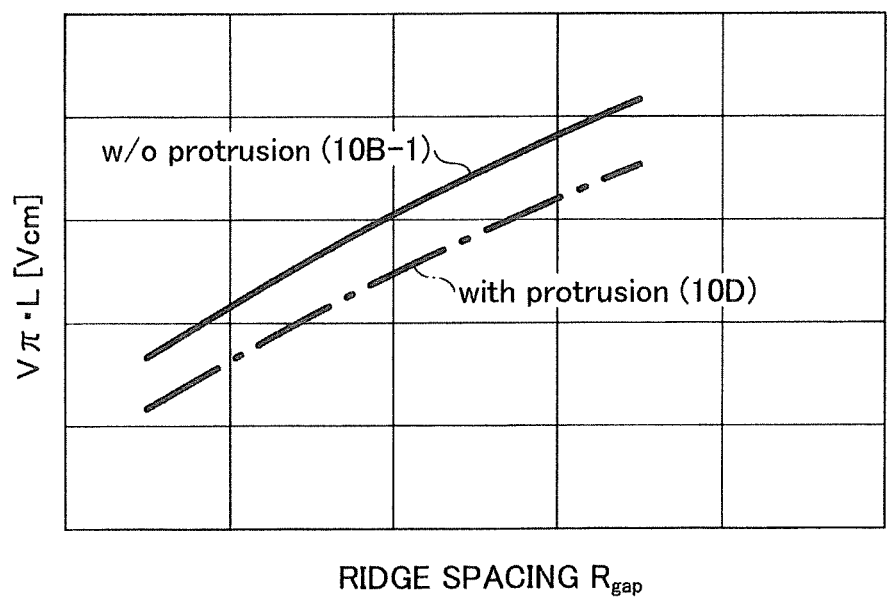
FIG. 14 illustrates an advantageous effect of the optical modulator of the fourth embodiment.

FIG. 14 illustrates an advantageous effect of the fourth embodiment. As a reference, the characteristic of the optical modulator 10B-1 of the second embodiment (in FIG. 7) is also illustrated. The V$\pi$*L value decreases and the modulation efficiency can be improved by narrowing the space $R_{gap}$ between the ridge centers of the optical waveguides 131a and 131b. This is the effect in common between the second and the fourth embodiments. In fact, the tendency of change in the modulation efficiency (V$\pi$*L) as a function of the space $R_{gap}$ between the ridge centers is the same between the optical modulator 10B-1 and the optical modulator 10D.

In the optical modulator 10D, the value of V$\pi$*L is further reduced by forming the terrace 124 in the thin film 12 under the ground electrode 15G, and the modulation efficiency is improved more effectively.

The optical modulator 10D employs the offset configuration, as in the optical modulator 10B-1 of FIG. 7, in which the ridges of the optical waveguides 131a and 131b are covered with an electrode film at both sidewalls, but the thickness of the electrode film on the inner sidewall of the ridge is set smaller than the thickness of the electrode film on the outer sidewall of the ridge. In place of this offset structure, another offset structure used in the optical modulator 10B-2 of FIG. 10, in which only the outer sidewalls of the ridges of the optical waveguides 131a and 131b are covered with the electrode films, may be combined with the terrace structure of the third embodiment. In this case, the space between the optical waveguides 131a and 131b becomes narrower than that in FIG. 13, and the modulation efficiency is further enhanced.

Other Modifications

Figure 15:
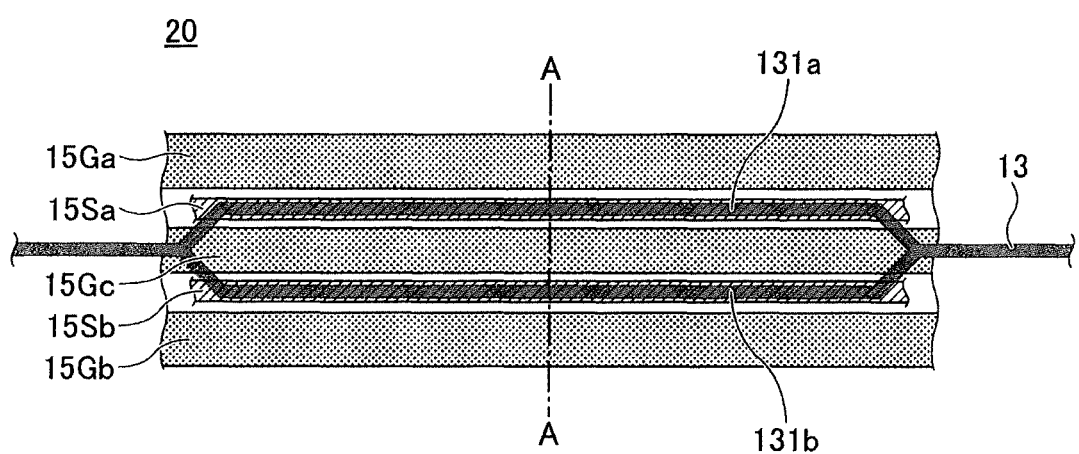
FIG. 15 is a plan view of an optical modulator with a differential-drive GSGSG electrode pattern.
Figure 16A:
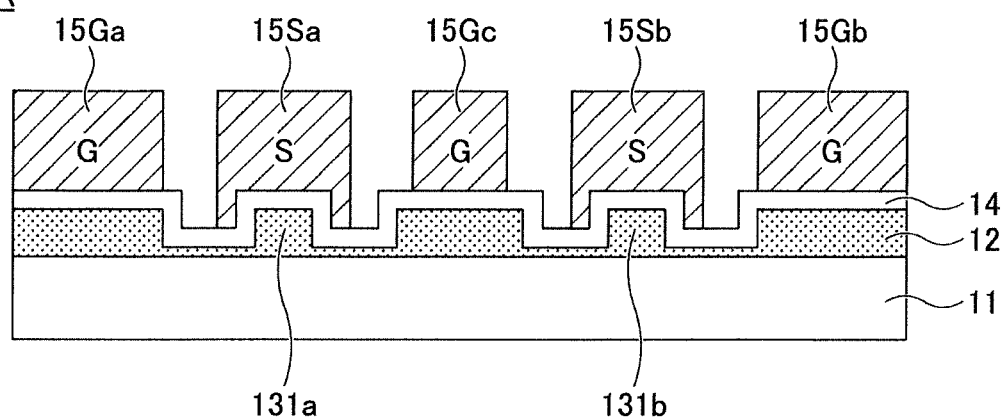
FIG. 16A is a schematic cross-sectional view of an optical modulator in which the GSGSG electrode pattern of FIG. 15 is applied to the configuration of the first embodiment.
Figure 16B:
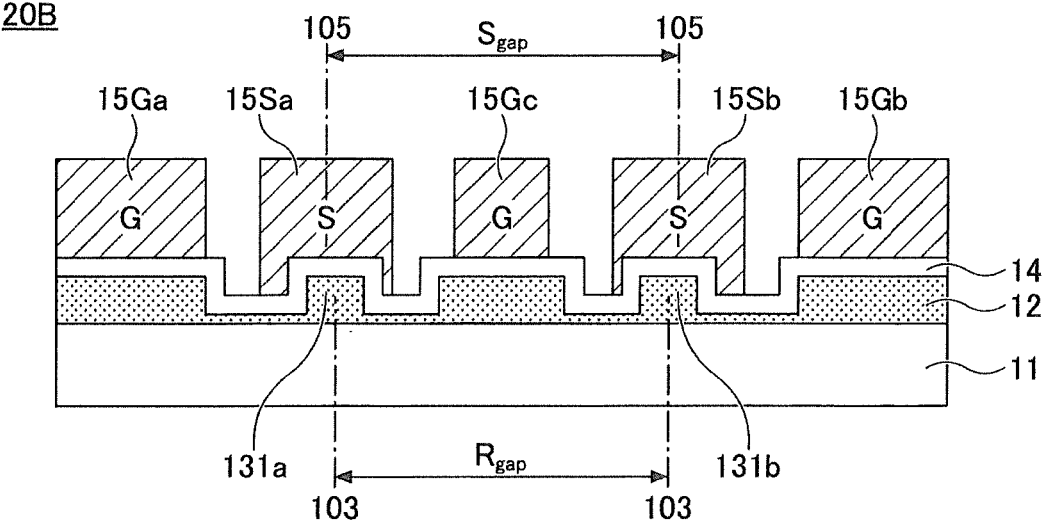
FIG. 16B is a schematic cross-sectional view of an optical modulator in which the GSGSG electrode pattern of FIG. 15 is applied to the configuration of the second embodiment.
Figure 16C:
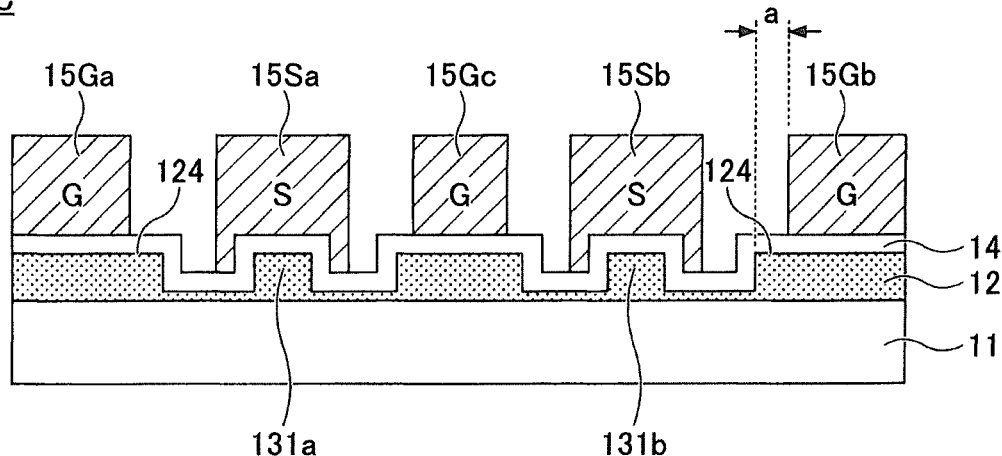
FIG. 16C is a schematic cross-sectional view of an optical modulator in which the GSGSG electrode pattern of FIG. 15 is applied to the configuration of the third embodiment.
Figure 16D:
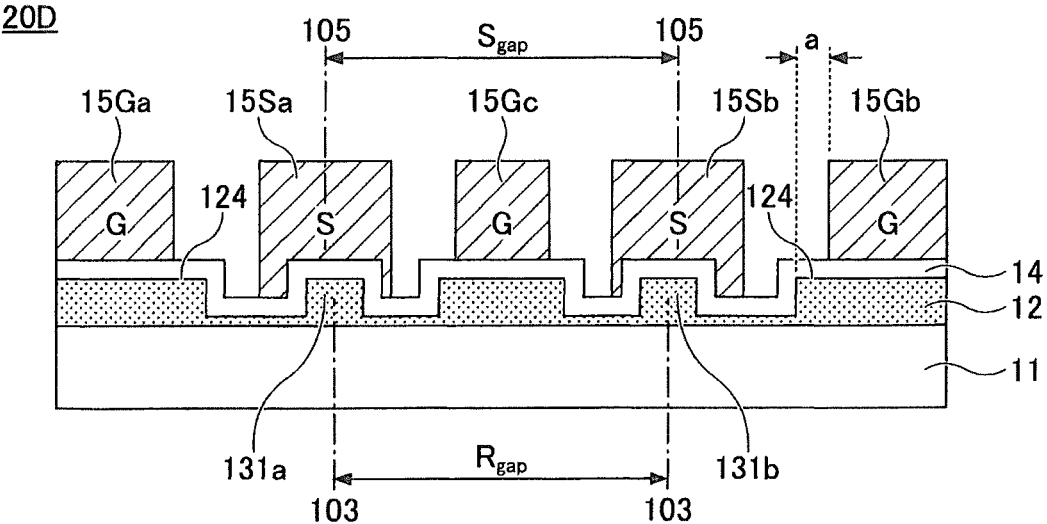
FIG. 16D is a schematic cross-sectional view of an optical modulator in which the GSGSG electrode pattern of FIG. 15 is applied to the configuration of the fourth embodiment.
Figure 17A:
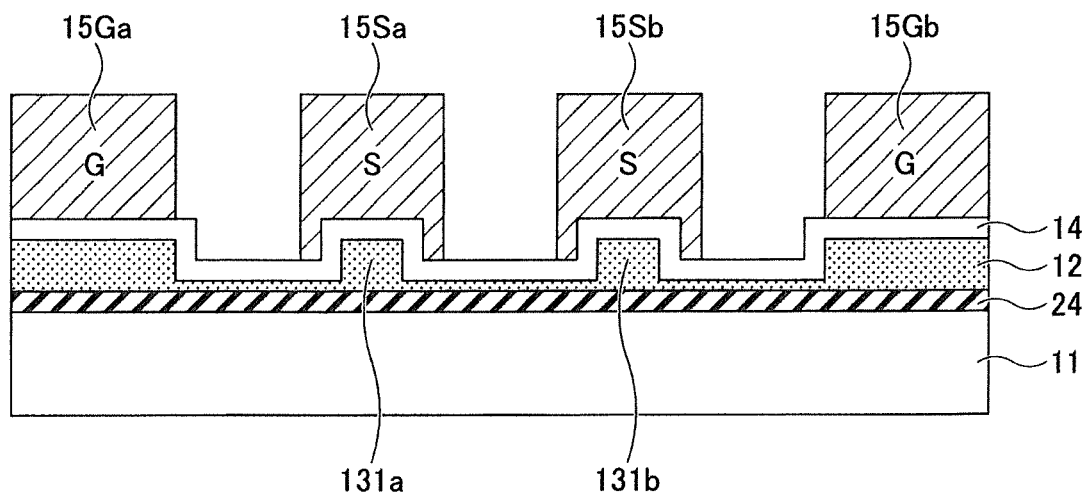
FIG. 17A illustrates a configuration in which a second buffer layer is inserted between the substrate and the thin film forming ridge-type optical waveguides based upon the structure of the first embodiment.
Figure 17B:
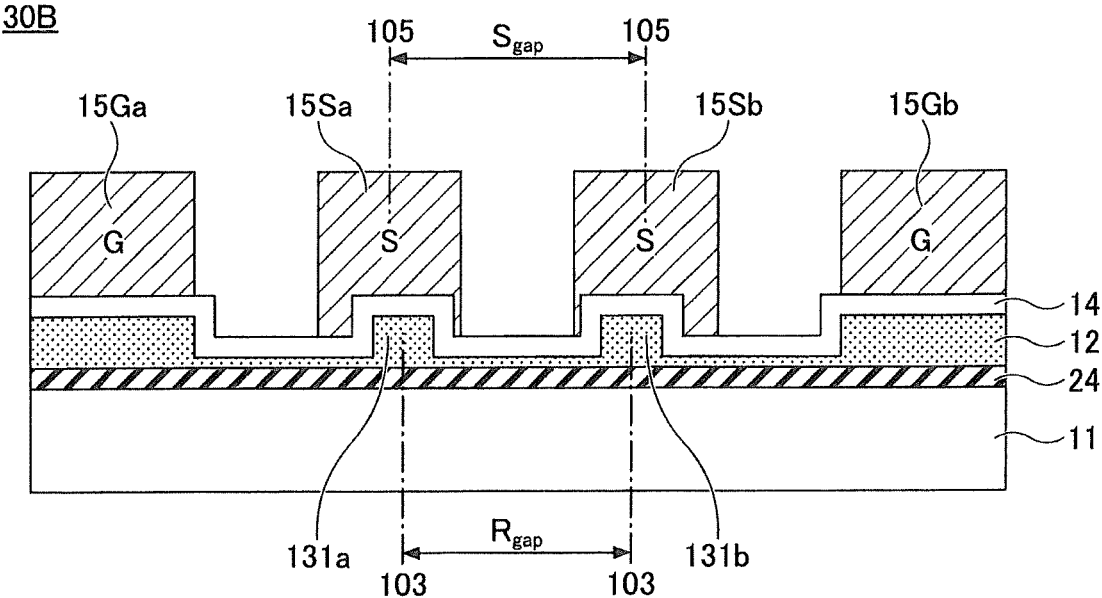
FIG. 17B illustrates a configuration in which a second buffer layer is inserted between the substrate and the thin film forming ridge-type optical waveguides based upon the structure of the second embodiment.
Figure 17C:
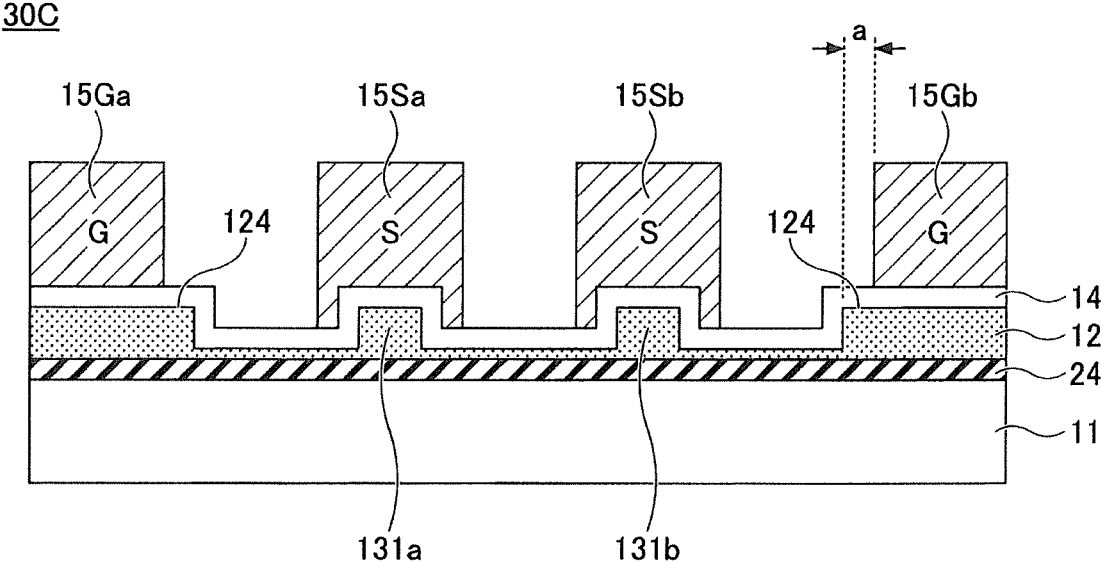
FIG. 17C illustrates a configuration in which a second buffer layer is inserted between the substrate and the thin film forming ridge-type optical waveguides based upon the structure of the third embodiment.
Figure 17D:
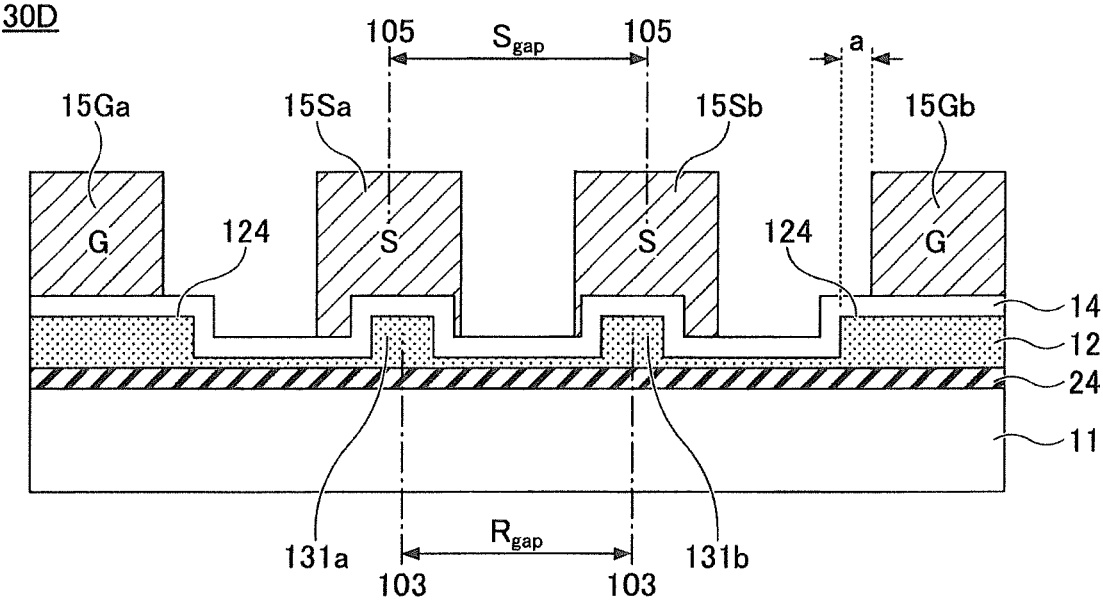
FIG. 17D illustrates a configuration in which a second buffer layer is inserted between the substrate and the thin film forming ridge-type optical waveguides based upon the structure of the fourth embodiment.

FIG. 15 is a plan view of an optical modulator 20 with a differential drive "GSGSG" configuration. A ground electrode 15Ga is provided outside the ridge-type optical waveguide 131a of a MZ interferometer, and a ground electrode 15Gb is provided outside the ridge-type optical waveguide 131b of the MZ interferometer in the interaction part. A ground electrode 15Gc is provided between the optical waveguides 131a and 131b. In this configuration, an electric field produced by the signal electrode 15Sa and the ground electrode 15Ga and an electric field produced by the signal electrode 15Sa and the ground electrode 15Gc are applied to the ridge of the optical waveguide 131a. Similarly, an electric field produced by the signal electrode 15Sb and the ground electrode 15Gb and an electric field produced by the signal electrode 15Sb and the ground electrode 15Gc are applied to the ridge of the optical waveguide 131b. This GSGSG electrode pattern can improve the modulation efficiency.

The space between the signal electrode 15Sa and the ground electrode 15Ga and the space between the signal electrode 15Sa and the ground electrode 15Gc are selected so as to be sufficiently narrow, as long as the capacitance does not exceed a threshold. Similarly, the space between the signal electrode 15Sb and the ground electrode 15Gb and the space between the signal electrode 15Sb and the ground electrode 15Gc are selected so as to be sufficiently narrow, as long as the capacitance does not exceed a threshold. Thereby, the electric field is applied efficiently in the direction substantially perpendicular to the substrate 11 onto the ridge of the optical waveguide 131 under the signal electrode 15S.

FIG. 16A to FIG. 16D are schematic cross-sectional views of optical modulators 20A to 20D in which the "GSGSG" electrode pattern of FIG. 15 is applied to the configurations of the first to the fourth embodiments. In any one of the configurations of the first to the fourth embodiments, the electric field is applied efficiently onto the ridge of the optical waveguide 131 by well-designing the layout of the signal electrode 15S with respect to the optical waveguide 131. In addition to this arrangement, by adopting the "GSGSG" electrode pattern, the electric field with a higher density can be applied to the ridge of the optical waveguide 131.

FIG. 17A to FIG. 17D illustrate configurations in which a second buffer layer 24 is provided in the optical modulators of the first to the fourth embodiments. The second buffer layer 24 is inserted between the substrate 11 and the thin film 12 that forms the ridge-type optical waveguides.

In the above-described embodiments, the substrate 11 is formed of a material with a refractive index lower than that of the thin film 12 and with light absorption less than the thin film 12. However, it may be desirable, depending on the circumstances, to use the same material (LiNbO$_3$, for example) for the substrate 11 and the thin film 12 from the viewpoints of thermal expansion coefficient, workability, and other factors. Furthermore, when different materials are used for the substrate 11 and the thin film 12 and when the refractive index of the substrate 11 is higher than that of the thin film 12, then light does not propagate through the ridge and will leak into the substrate 11. In these cases, the buffer layer 24 is inserted between the substrate 11 and the thin film 12 that forms the optical waveguides 131. The buffer layer 24 is preferably made of a material whose refractive index is lower than that of the thin film 12 and whose dielectric constant is matched to the thin film 12. For example, the buffer layer 24 may be formed of SiO$_2$. With this configuration, the freedom of material selection for the substrate 11 is expanded, and the workability and designability of the optical modulators 30A to 30D are enhanced.

Figure 18:
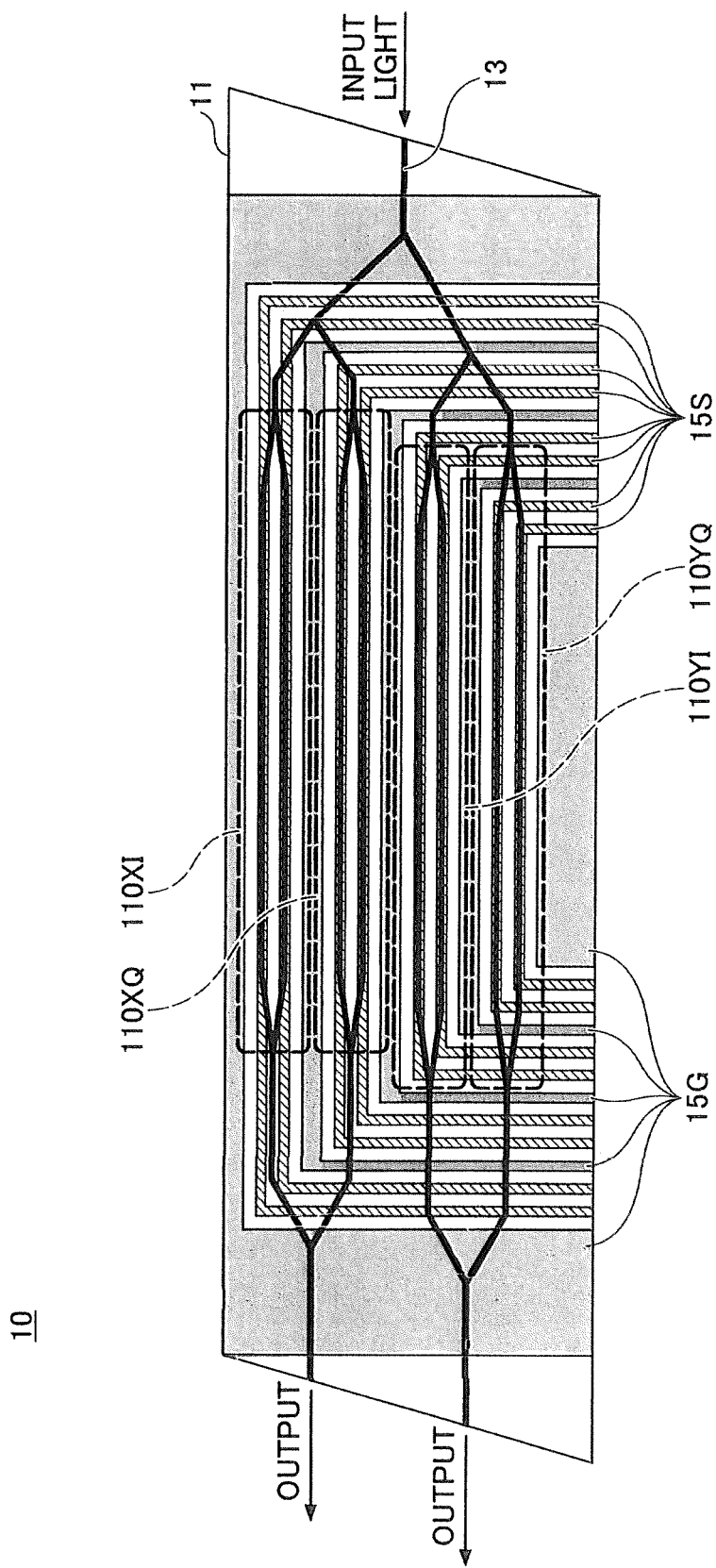
FIG. 18 is a plan view in which a differential-drive GSSG electrode pattern is applied to a dual polarization quadrature phase shift keying (DP-QPSK) optical modulator.

FIG. 18 is a plan view of the GSSG differential electrode pattern of the embodiment applied to a DP-QPSK optical modulator 10.

The optical modulator 10 has interaction parts 110XI, 110XQ, 110YI, 110YQ (which may be referred to collectively as "interaction part 110" as appropriate) formed by four MZ interferometers arranged in parallel. In each interaction part 110, signal electrodes 15S are provided to a pair of optical waveguides. Each of the signal electrode 15S is extracted as an RF terminal to the side edge of the substrate 11. Ground electrodes 15G are provided such that the two signal electrodes 15S are located between the ground electrodes 15G.

The light input to the optical waveguide 13 is split into two. Each of the split light is subjected to IQ modulation through the I-branch and the Q-branch, then combined and output. One of the two light beams output from the optical modulator 10 is subjected to polarization rotation of 90 degrees in the subsequent stage. Two light components whose polarization directions are orthogonal to each other are multiplexed and output as an optical signal.

Using two polarizations (X-polarized light and Y-polarized light), each polarization conveys 2-bit information by IQ modulation, and one symbol represents 4-bit information.

Because each of the interaction parts 110XI, 110XQ, 110YI, and 110YQ has the above-described signal electrode configuration of an embodiment, the modulation efficiency of the optical modulator 10 is enhanced, and the RF characteristics are satisfactory.

Figure 19:
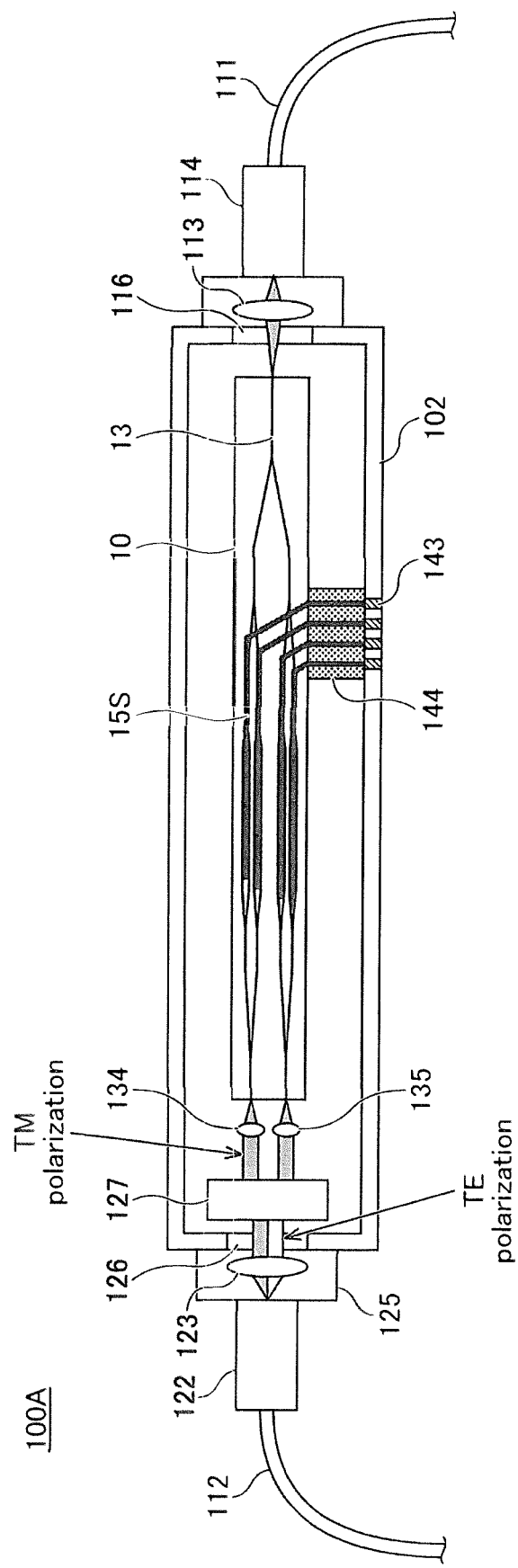
FIG. 19 is a schematic diagram of an optical modulator module in which an optical modulator of an embodiment and other optical components are integrated in a package.

FIG. 19 is a schematic view of an optical modulator module 100A using an optical modulator 10 of an embodiment. The optical modulator module 100A has an optical modulator 10 integrated together with other optical components in a package 102. The optical modulator 10 may be any one of the optical modulators 10A to 10D of the first to the fourth embodiments. Alternatively, any one of the optical modulators 20A to 20D or any one of the optical modulators 30A to 30D of the modifications may be used.

The package 102 is connected to an input fiber 111 by a metal ferrule 114 at the input side, and connected to an output fiber 112 by a metal ferrule 122 at the output side. The light emitted from the input fiber 111 is condensed by the lens 113, passes through the transparent window 116, and is incident on the optical waveguide 13 of the optical modulator 10. The light incident on the optical waveguide 13 is then split and guided to four interaction parts 110XI, 110XQ, 110YI, and 110YQ (see FIG. 18).

Signal electrodes 15S are provided in each of the interaction parts 110XI, 110XQ, 110YI, and 110YQ, and RF signal voltages are applied to the optical waveguide pair at each interaction part 110 by a differential drive mode. The signal electrodes 15S are connected to an external electric circuit using an interposer board 144 and a connector 143, and high-speed analog drive signals (differential signals) are supplied externally.

The two light beams output from the optical modulator 10 are collimated by collimator lenses 134 and 135, respectively, and guided to a polarization combiner 127. The polarization combiner 127 includes a polarization rotator, which rotates the polarization plane of one of the two light beams by 90 degrees. For example, two TM polarized lights are output from the optical modulator 10, and one of the two TM polarized lights is converted into TE polarized light by the polarization combiner 127. The light output from the polarization combiner 127 contains TM polarized light and TE polarized light, each conveying two bits of information. The combined light passes through the transparent window 126, through the lens 123 held by the lens holder 125, and enters the output fiber 112 held by the metal ferrule 122.

Each interaction part 110 of the optical modulator 10 has the optimal configuration of signal electrodes, such that electric field signals are applied efficiently onto the ridges of the optical waveguides. The optical modulator 10 has satisfactory modulation efficiency and RF characteristics, and a compact and low power consumption optical modulator module 100A is achieved.

Figure 20:
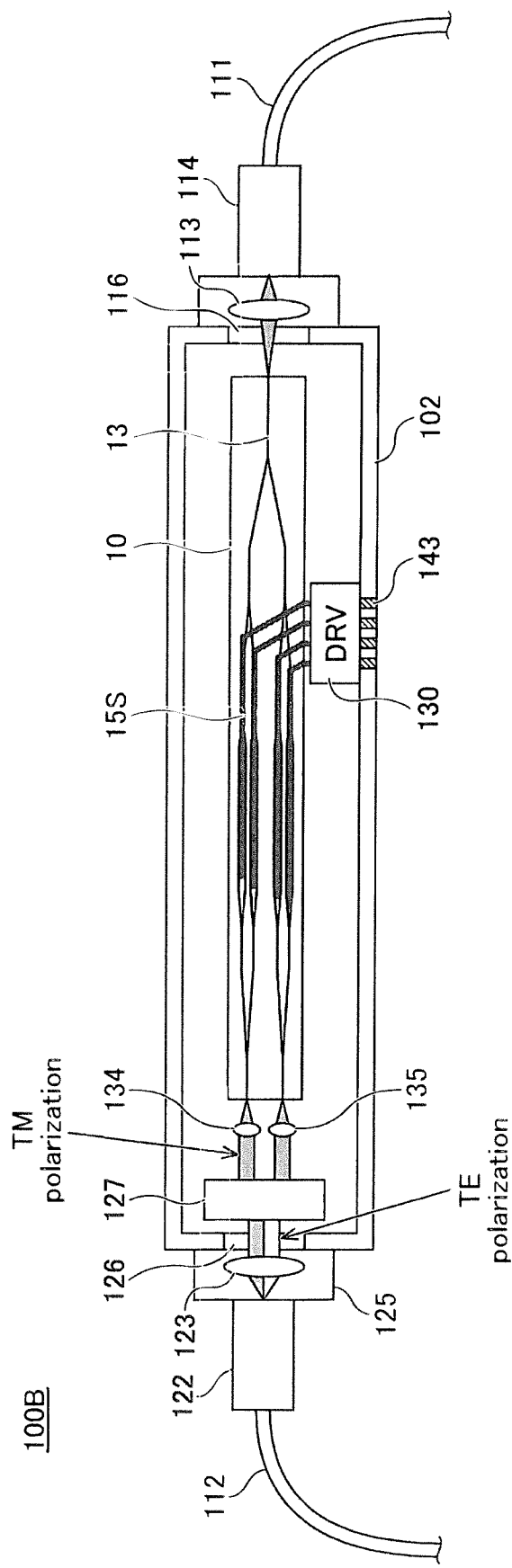
FIG. 20 is a schematic diagram of an optical modulator module in which an optical modulator of an embodiment and driver circuits are integrated in a package.

FIG. 20 illustrates another example of an optical modulator module 100B. The optical modulator module 100B is a driver-integrated module in which an optical modulator 10 of any one of the above-described embodiments is integrated together with a driver circuit (denoted as "DRV" in the drawing) 130 in a package 102. Four pairs of differential signals are output from the driver circuit 130 and input to four interaction parts 110 of the optical modulator 10. With this configuration, a driver-integrated optical modulator module 100B is achieved in a compact design.

Figure 21:
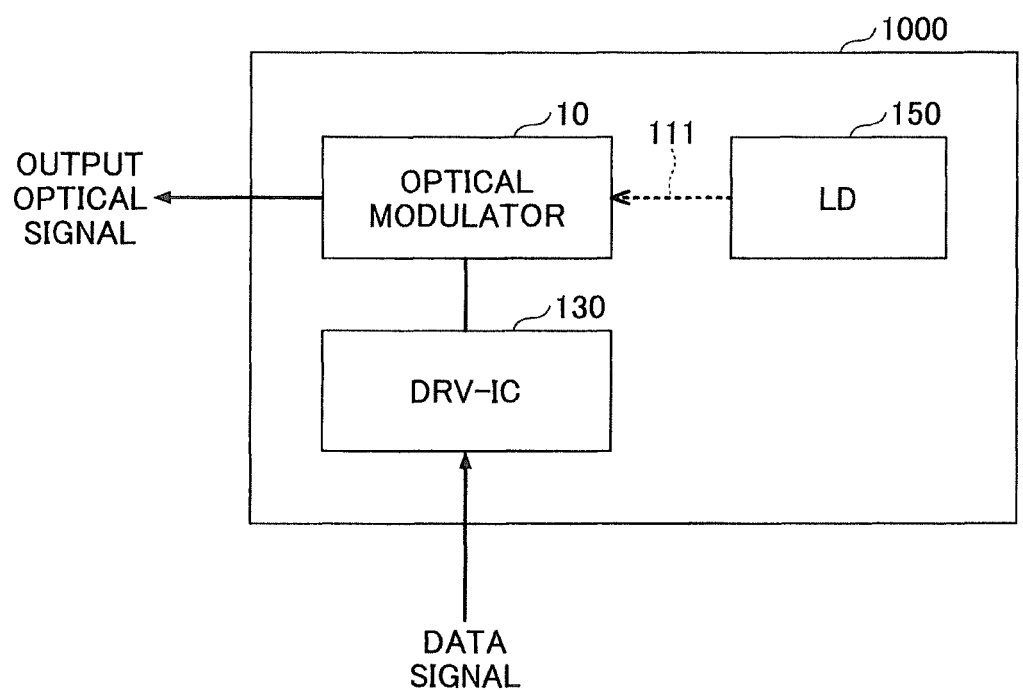
FIG. 21 is a schematic diagram of an optical transmitter module using an optical modulator of an embodiment.

FIG. 21 is a schematic diagram of an optical transmitter module 1000 using the optical modulator of any one of the embodiments. The optical transmitter module 1000 includes the optical modulator 10 of an embodiment, a light source 150, and a driver circuit (denoted as "DRV-IC" in the FIG. 130. The driver circuit 130 is connected to an external electric circuit, such as a serializer, by a connector 143.

The light source 150 is, for example, a wavelength tunable light source using a laser diode (LD) and a wavelength locker, and it is configured to output light of a predetermined wavelength. The light beam emitted from the light source 150 may be input to the optical modulator 10 using an input fiber 111, or alternatively, one or more optical elements such as a collimating lens or a mirror may be used.

When a data signal is externally input to the driver circuit 130, the driver circuit 130 generates high-speed analog drive signals according to the logic values of the input data, and supplies the drive signals to the optical modulator 10. The drive signals input to the optical modulator 10 modulate the light travelling through the optical waveguides. The optical signal generated by the optical modulator 10 is output from the optical transmitter module 1000. The optical modulator 10 has satisfactory modulation efficiency and RF characteristics. A compact and low power consumption optical transmitter module 1000 is realized.

Although the present invention has been described based upon the specific embodiments, the present invention is not limited to the above-described configurations, and includes various substitutions and alterations. For example, in the "GSGSG" electrode pattern of FIG. 16A to FIG. 16D, the second buffer layer 24 may be inserted between the substrate 11 and the thin film 12 forming the ridge-type optical waveguides as illustrated in FIG. 17A to FIG. 17D, when the optical properties of the thin film 12 and the substrate 11 are similar to each other. The "GSGSG" electrode pattern of FIG. 16A to FIG. 16D and insertion of the second buffer layer 24 of FIG. 17A to FIG. 18D may be applied to the configuration of FIG. 10 in which the conductive film of the signal electrode S is provided only to the outer sidewall of the ridge of the corresponding optical waveguide.

The modulation scheme of the optical modulator 10, 20, or 30 is not limited to DP-QPSK, and the configurations of the optical modulators of the embodiments are applied to other multi-level modulation schemes such as BPSK, QPSK, 16 QAM, 32 QAM, 64 QAM, etc., making use of optical phase rotation of light under application of the electric field. In either case, an electric field can be applied efficiently onto the ridge-type optical waveguide. The half-wave voltage Vπ is reduced, and an optical modulator with satisfactory modulation efficiency and high-frequency characteristics can be achieved.

The thin film material used for the ridge waveguide is not limited to LiNbO$_3$ and other materials having an electro-optic constant equal to or greater than LiNbO$_3$ may be used. Such materials include, but are not limited to, LiTaO$_3$ and KTiOPO$_4$.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority or inferiority of the invention. Although the embodiments of the present inventions have been described in detail, it should be understood that the various changes, substitutions, and alterations could be made hereto without departing from the spirit and scope of the invention.

What is claimed is:

1. An optical modulator comprising:
   an optical waveguide of a ridge type formed of a thin film of a dielectric material having an electro-optic effect over a substrate;
   a buffer layer covering the optical waveguide; and
   a signal electrode provided over the optical waveguide via the buffer layer,
   wherein a width of the signal electrode is greater than a ridge width of the optical waveguide and wherein the signal electrode covers at least one of sidewalls of a ridge of the optical waveguide, and
   wherein the signal electrode covers, via the buffer layer, both sidewalls of the ridge of the optical waveguide symmetrically or asymmetrically with respect to a center in a width direction of the ridge.

2. An optical modulator comprising:
   an optical waveguide of a ridge type formed of a thin film of a dielectric material having an electro-optic effect over a substrate;
   a buffer layer covering the optical waveguide;
   a signal electrode provided over the optical waveguide via the buffer layer; and
   a ground electrode provided over the thin film at a predetermined distance from the signal electrode,
   wherein a width of the signal electrode is greater than a ridge width of the optical waveguide and wherein the signal electrode covers at least one of sidewalls of a ridge of the optical waveguide, and
   wherein the thin film located under the ground electrode has a terrace protruding toward the optical waveguide from a sidewall of the ground electrode.

3. The optical modulator as claimed in claim 1,
   wherein the optical waveguide includes a first waveguide and a second waveguide that form a Mach-Zehnder interferometer,
   wherein the signal electrode includes a first signal electrode provided to the first waveguide and a second signal electrode provided to the second waveguide, and
   wherein a space between centers of the first signal electrode and the second signal electrode is greater than a space between ridge centers of the first waveguide and the second waveguide.

4. An optical modulator comprising:
   an optical waveguide of a ridge type formed of a thin film of a dielectric material having an electro-optic effect over a substrate;
   a buffer layer covering the optical waveguide; and
   a signal electrode provided over the optical waveguide via the buffer layer,
   wherein a width of the signal electrode is greater than a ridge width of the optical waveguide and wherein the signal electrode covers at least one of sidewalls of a ridge of the optical waveguide,
   wherein the optical waveguide includes a first waveguide and a second waveguide that form a Mach-Zehnder interferometer,
   wherein the signal electrode includes a first signal electrode provided to the first waveguide and a second signal electrode provided to the second waveguide,
   wherein a space between centers of the first signal electrode and the second signal electrode is greater than a space between ridge centers of the first waveguide and the second waveguide,
   wherein the first signal electrode covers an outer sidewall of a first ridge of the first waveguide with respect to a center axis of the Mach-Zehnder interferometer, and aligns with a surface of the buffer layer at an inner sidewall of the first ridge, and
   wherein the second signal electrode covers an outer sidewall of a second ridge of the second waveguide with respect to the center axis of the Mach-Zehnder interferometer, and aligns with the surface of the buffer layer at an inner sidewall of the second ridge.

5. The optical modulator as claimed in claim 2,
   wherein the optical waveguide includes a first waveguide and a second waveguide that form a Mach-Zehnder interferometer,
   wherein the signal electrode includes a first signal electrode provided to the first waveguide and a second signal electrode provided to the second waveguide, and
   wherein the ground electrode includes a first ground electrode provided at an outer side of the first signal electrode and a second ground electrode provided at an outer side of the second signal electrode, with respect to a center axis of the Mach-Zehnder interferometer.

6. The optical modulator as claimed in claim 5, wherein the thin film located under the first ground electrode has a first terrace protruding toward the first waveguide and the thin film located under the second ground electrode has a second terrace protruding toward the second waveguide.

7. The optical modulator as claimed in claim 5, further comprising:
   a third ground electrode provided between the first signal electrode and the second signal electrode.

8. The optical modulator as claimed in claim 6, further comprising:
   a third ground electrode provided between the first signal electrode and the second signal electrode.

9. The optical modulator as claimed in claim 1, wherein the substrate has a refractive index lower than a refractive index of the thin film.

10. The optical modulator as claimed in claim 1, further comprising:
    a second buffer layer provided between the substrate and the thin film.

11. An optical modulator module comprising:
    an optical modulator having an optical waveguide of a ridge type formed of a thin film of a dielectric material having an electro-optic effect over a substrate, a buffer layer covering the optical waveguide, and a signal electrode provided over the optical waveguide via the buffer layer; and
    a package to accommodate the optical modulator, wherein a width of the signal electrode of the optical modulator is greater than a ridge width of the optical waveguide and wherein the signal electrode of the optical modulator covers at least one of sidewalls of a ridge of the optical waveguide, and wherein the signal electrode covers, via the buffer layer, both sidewalls of the ridge of the optical waveguide symmetrically or asymmetrically with respect to a center in a width direction of the ridge.

12. The optical modulator module as claimed in claim 11, further comprising:
a driver circuit provided in the package and electrically connected to the signal electrode of the optical modulator.

13. An optical transmitter module comprising:
the optical modulator as claimed in claim 1;
a light source configured to output light to be input to the optical modulator; and
a driver circuit configured to drive the optical modulator.

14. An optical transmitter module comprising:
the optical modulator as claimed in claim 2;
a light source configured to output light to be input to the optical modulator; and
a driver circuit configured to drive the optical modulator.

15. An optical transmitter module comprising:
the optical modulator as claimed in claim 4;
a light source configured to output light to be input to the optical modulator; and
a driver circuit configured to drive the optical modulator.

* * * * *